United States Patent [19]

Burnham et al.

[11] Patent Number: 5,212,511
[45] Date of Patent: May 18, 1993

[54] EASY LOADING CAMERA

[75] Inventors: William L. Burnham, Leroy; Joel S. Lawther, Rochester, both of N.Y.

[73] Assignee: Eastman Kodak Company, Rochester, N.Y.

[21] Appl. No.: 825,883

[22] Filed: Jan. 27, 1992

[51] Int. Cl.⁵ .............................................. G03B 1/00
[52] U.S. Cl. ..................................... 354/212; 354/288
[58] Field of Search ........ 354/173.1, 173.11, 212–216, 354/275, 288

[56] References Cited

U.S. PATENT DOCUMENTS

| | | | |
|---|---|---|---|
| 2,548,549 | 4/1951 | Mihalyi | 354/288 |
| 4,363,547 | 12/1982 | Hashimoto et al. | 354/212 |
| 4,469,421 | 9/1984 | Kamata | 354/212 |
| 4,516,843 | 5/1985 | Ohmura | 354/173.1 |
| 4,752,797 | 6/1988 | Sekine et al. | 354/212 |
| 4,841,319 | 6/1989 | Hansen | 354/275 |

*Primary Examiner*—Michael L. Gellner
*Assistant Examiner*—Howard B. Blankenship
*Attorney, Agent, or Firm*—Roger A. Fields

[57] ABSTRACT

A camera is intended to be used with a film cartridge that has a normally curled film leader protruding from the cartridge. In the camera, a first cartridge-receiving chamber portion has an open end and side which allow the cartridge to be received in the first chamber portion laterally through the open side with one end of the cartridge protruding from the open end and the curled leader protruding from the open side. This permits the end of the cartridge protruding from the first chamber portion to be manually grasped in order to rotate the cartridge within the first chamber portion in the particular direction of curl of the leader. An elongate surface is arranged proximate the first chamber portion to force the leader to uncurl against the elongate surface to substantially flatten when the cartridge is rotated within the first chamber portion in the particular direction of curl of the leader. A second cartridge-receiving chamber portion has an open end which opens to the first chamber portion to allow the cartridge to be inserted with the leader substantially flattened against the elongate surface into the second chamber portion from the first chamber portion.

7 Claims, 4 Drawing Sheets

EASY LOADING CAMERA

BACKGROUND OF THE INVENTION

1. Field of the Invention

The invention relates generally to the field of photographic cameras, and in particular to camera apparatus for facilitating manual insertion of a 35 mm film cartridge into the camera body.

2. Description of the Prior Art

Generally speaking, commercially available 35 mm film cartridges such as manufactured by Eastman Kodak Company, comprise a hollow cylindrical shell having an integral throat or lipped portion which extends tangentially from the shell. A film spool on which the filmstrip is wound is freely rotatable within the cylindrical shell. The filmstrip has a leading end section, commonly referred to as a "film leader", which extends through a light-trapped slit in the throat portion to the outside of the shell. Typically, the film leader is 2-3 inches in length and is normally curled about the shell.

When loading a conventional camera with such a film cartridge, a rear door of the camera body is widely opened. Then, the cartridge with the film leader held uncurled from around the cylindrical shell is inserted into a rear loading chamber in the camera body. The manually straightened leader is positioned with its leading tip adjacent a take-up drum in the camera body, and with one or more of its perforations in engagement with a corresponding number of teeth of a metering sprocket located between the take-up drum and the loading chamber. This film loading operation is rather troublesome and requires a certain amount of skill and manual dexterity. Accordingly, it is rather difficult for certain people.

More recently, several bottom loading cameras have been proposed which include simple means for automatically uncurling the film leader from around the cylindrical shell as the film cartridge is inserted endwise, i.e. axially, through a bottom opening to the loading chamber in the camera body. For example, in commonly assigned U.S. Pat. No. 4,332,453, granted Jun. 1, 1982, the automatic uncurling means comprises a quarter-round corner located adjacent the loading chamber in the camera body and an inclined straight edge extending generally along the bottom of the camera body. When a bottom door of the camera body is widely opened and the cartridge is initially inserted into the loading chamber, a full width (uncut) section of the film leader adjacent the throat portion of the cartridge is pushed against the quarter-round corner. The quarter-round corner in turn deflects the full width section of the leader to position a reduced width (cut) section of the leader forward of the full width section crosswise against the inclined straight edge. Then, with continued insertion of the cartridge into the loading chamber, the reduced width section of the leader is progressively straightened by its movement against the inclined straight edge. Thus, the film leader is progressively uncurled as the cartridge is inserted axially into the loading chamber. This manner of film loading requires that the user be educated to a non-traditional approach.

A third manner of film loading is shown in U.S. Pat. No. 4,363,547, granted Dec. 14, 1982. There, the loading chamber is pivotally supported for swinging movement out of the camera body to receive the film cartridge axially. The loading chamber includes a spindle for the cartridge which is continuously coupled with a drive mechanism in the camera body. This arrangement increases manufacturing costs to a significant extent.

SUMMARY OF THE INVENTION

According to the invention, a photographic camera intended to be used with a film cartridge that has a normally curled film leader protruding from the film cartridge comprises:

a first cartridge-receiving chamber portion having an open end and side which allow the film cartridge to be received in the first chamber portion laterally through the open side with one end of the film cartridge protruding from the open end and the curled film leader protruding from the open side, to permit the one end to be manually grasped in order to rotate the film cartridge within the first chamber portion in the particular direction of curl of the film leader.

an elongate surface arranged proximate the first chamber portion to force the curled film leader to uncurl against the elongate surface to substantially flatten when the film cartridge is rotated within the first chamber portion in the particular direction of curl of the film leader; and a second cartridge-receiving chamber portion having an open end which opens to the first chamber portion to allow the film cartridge to be inserted with the film leader substantially flattened against the elongate surface into the second chamber portion from the first chamber portion.

DETAILED DESCRIPTION OF THE PREFERRED EMBODIMENT

Figure 1:
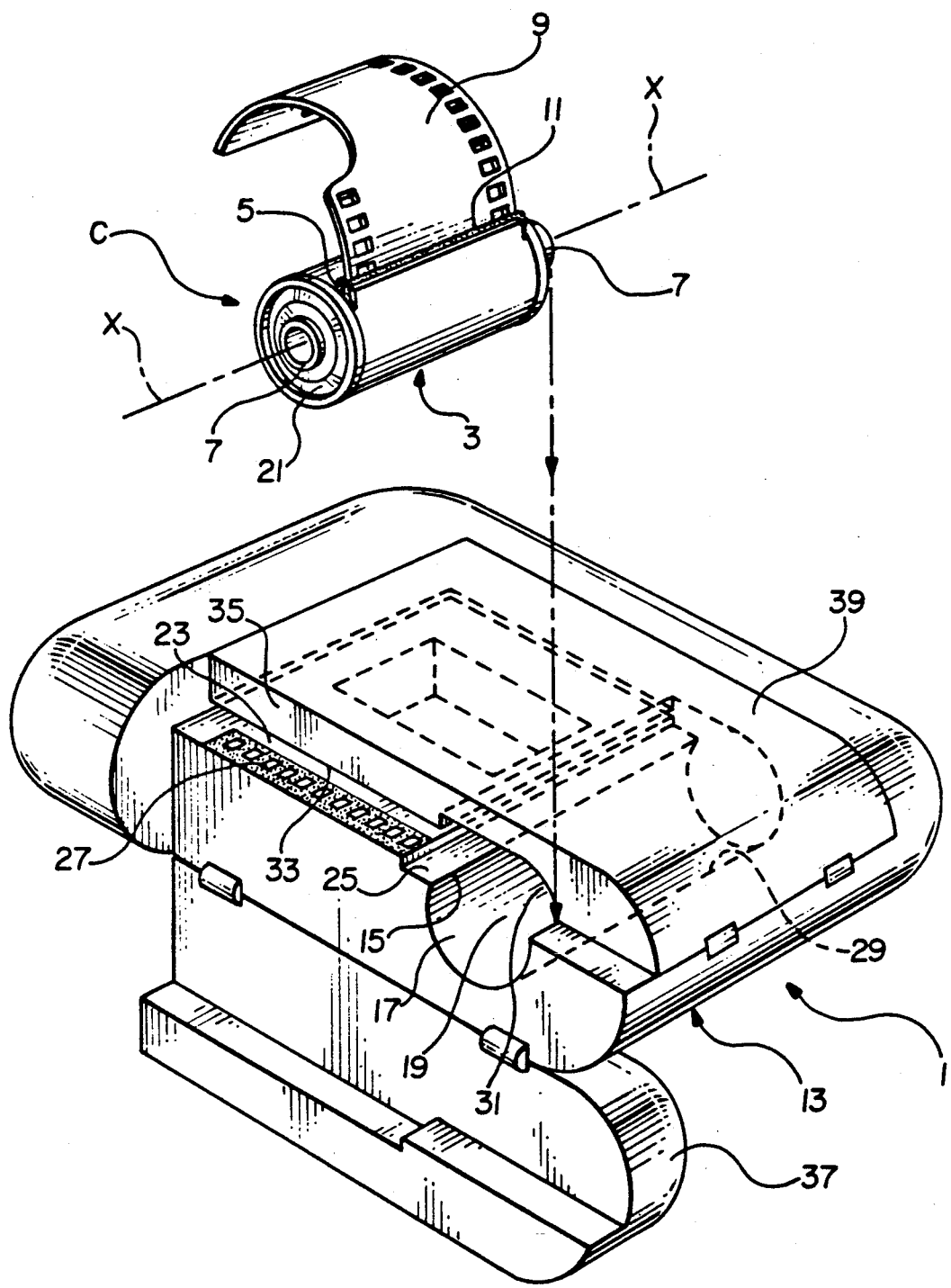
FIG. 1 is a rear perspective view of an easy loading camera according to a preferred embodiment of the invention.

The invention is described as being embodied in a compact 35 mm camera. Because such a camera has become well known, this description is directed only to elements forming part of or cooperating directly with the preferred embodiment. It is to be understood, however, that elements not specifically shown or described may take various forms known to persons of ordinary skill in the art.

Referring now to the drawings, a compact camera 1 is shown which is intended to be used with a conventional 35 mm film cartridge C. The cartridge C comprises a hollow cylindrical shell 3 having an integral throat or lipped portion 5 which extends tangentially from the shell. A film spool 7 on which a filmstrip is wound is freely rotatable within the cylindrical shell 3 about an axis X. The filmstrip has a leading end section 9, commonly referred to as a "film leader", which extends through a light-trapped slit 11 in the throat portion 5 to the outside of the shell 3. Typically, the film leader 9 is 2-3 inches in length and is normally curled lengthwise about the shell 3.

Figure 2:
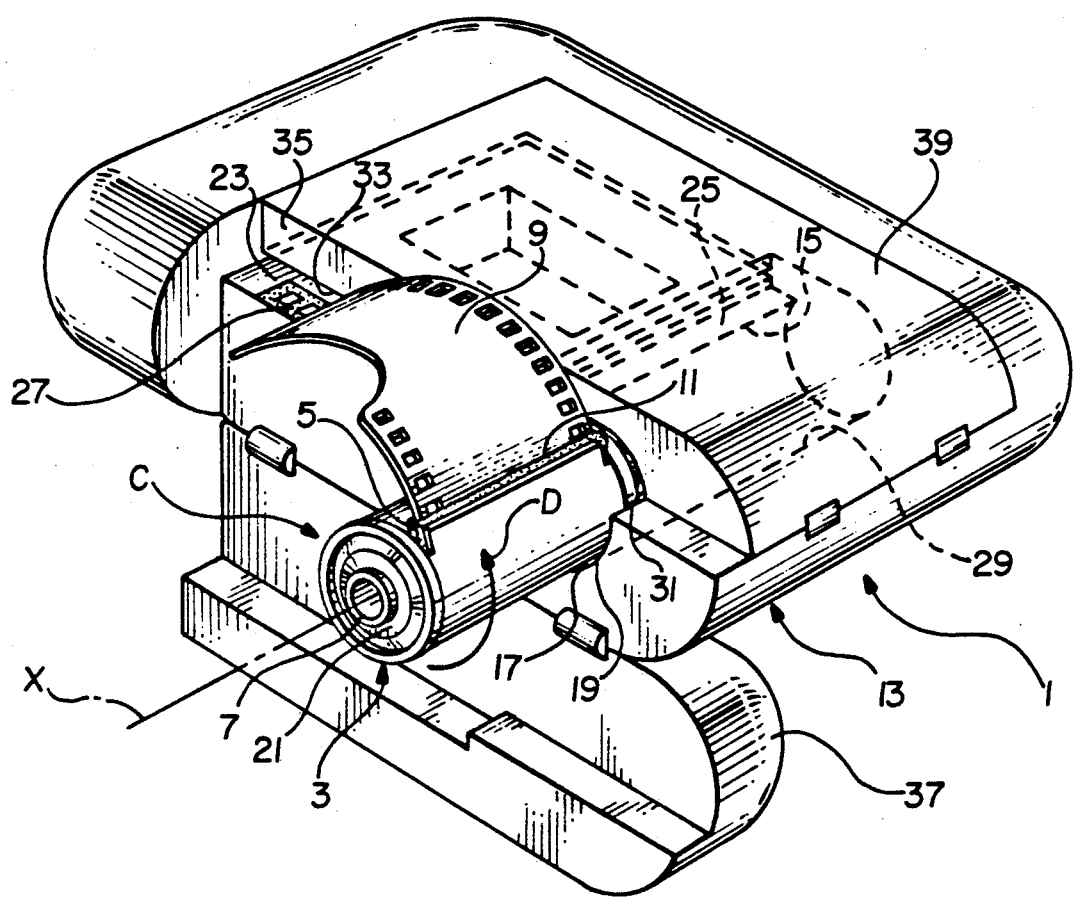
FIGS. 2, 3, and 4 are perspective views similar to FIG. 1, illustrating the film loading procedure.
Figure 3:
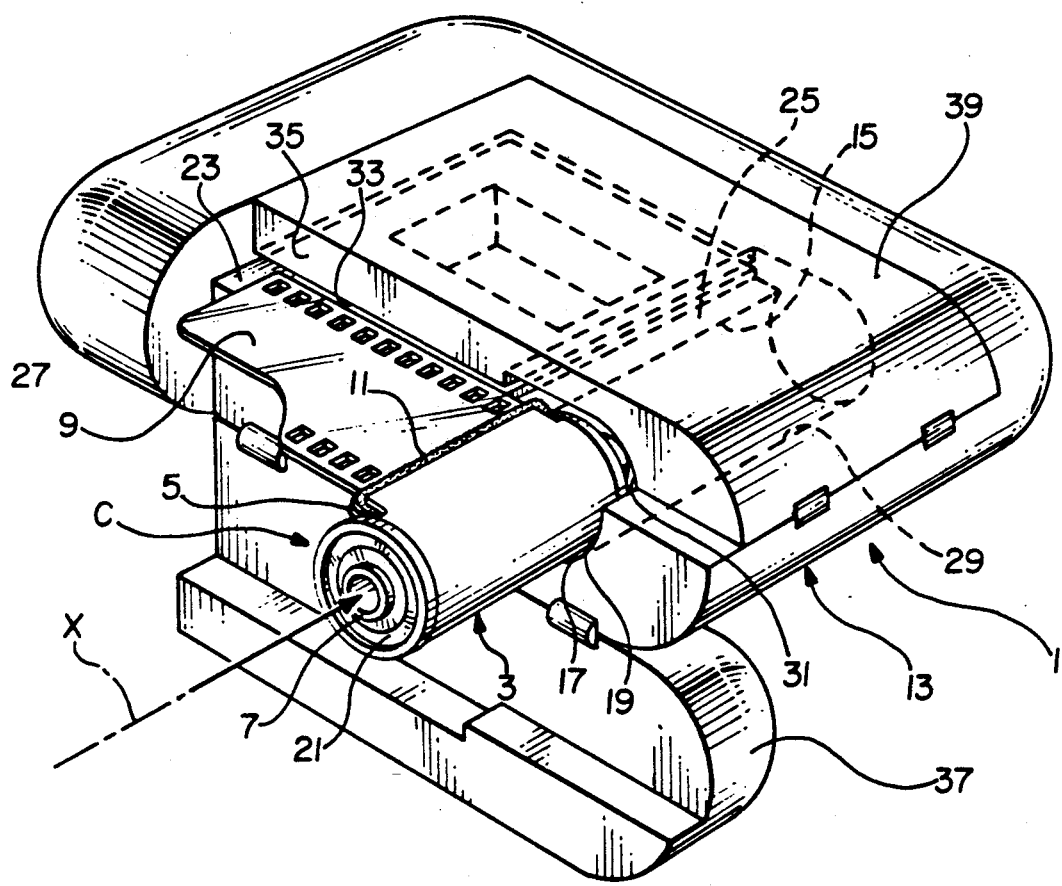

The compact camera 1 comprises a camera body 13 including a first cartridge-receiving chamber portion 15 having an open end 17 and side 19 which allow the cartridge C to be received in the first chamber portion laterally through the open side with one end 21 of the cartridge protruding from the open end and the curled leader 9 protruding from the open end. See FIGS. 1 and 2. This Permits the one end 21 of the cartridge C Protruding from the open end 17 of the first chamber portion 15 to be manually grasped in order to rotate the cartridge within the first chamber portion, about the axis X, in the particular direction D of curl of the leader 9. See FIG. 2. An elongate flat surface 23 is arranged proximate the first chamber portion 15 to force the leader 9 to longitudinally uncurl against the flat surface to substantially flatten when the cartridge is rotated within the first chamber portion in the particular direction D of curl of the leader. See FIG. 3. A stop 25 is located immediately between the open side 19 of the first chamber portion 15 and the flat surface 23 to prevent rotation of the cartridge C further in the direction D once the leader 9 is substantially flattened against the flat surface. Preferably, an imprint 27 is provided on the flat surface 23 for visibly indicating the location of the leader 9 when it is flattened against the flat surface.

Figure 4:
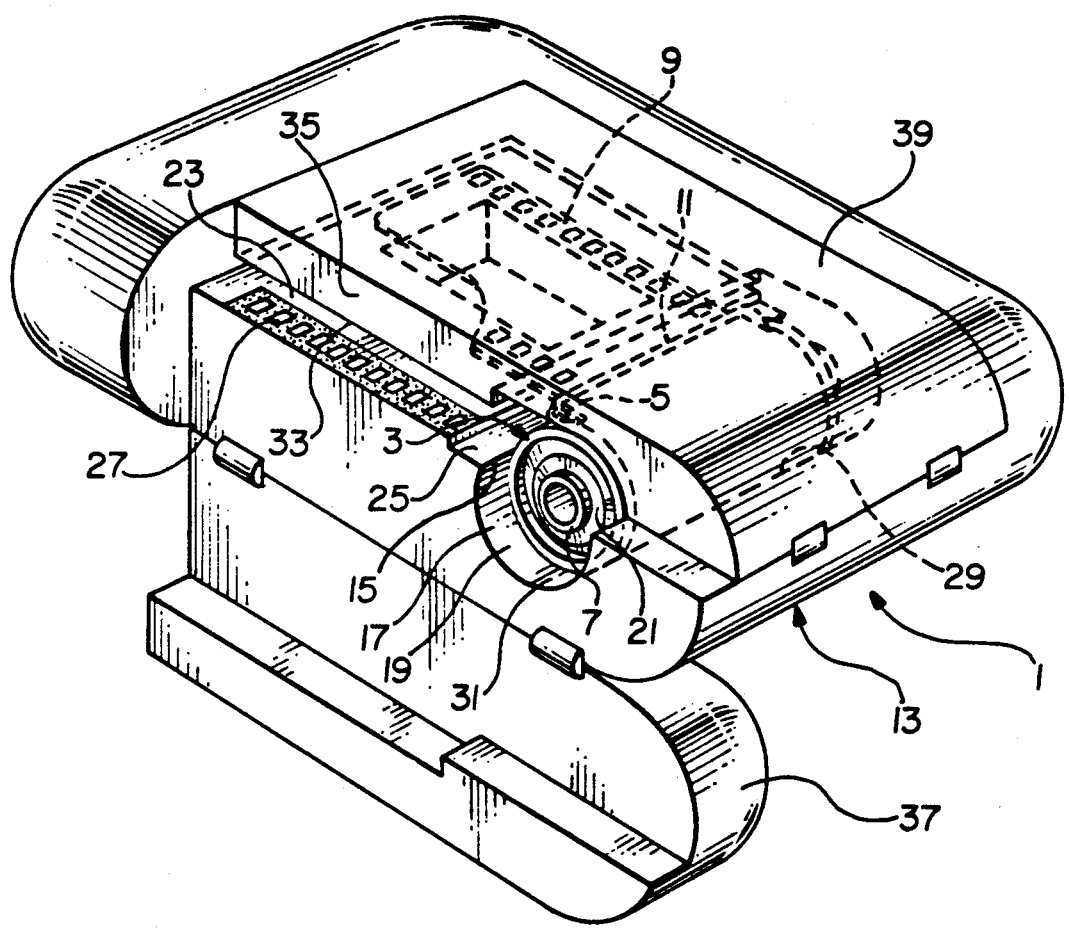

The camera body 13 includes a second cartridge-receiving chamber portion 29 having an open end 31 which opens to the first chamber portion 15 to allow the cartridge C to be axially inserted with the leader 9 flattened against the flat surface 23 into the second chamber portion from the first chamber portion. See FIG. 4. A slit 33 is formed in the camera body 13 to receive the leader 9 longitudinal edge first as the cartridge C is inserted into the second chamber portion 29. Preferably, a ledge 35 extends perpendicular to the flat surface 23 to block the leader 9 to prevent the cartridge C from being inserted into the second chamber portion 29 unless the leader is flattened against the flat surface.

A bottom door 37 is pivotally coupled to the camera body 13 for opening movement to uncover the first chamber portion 15, the flat surface 23, the slit 33, the ledge 35, and the open end 31 of the second chamber portion 29. For cartridge loading, only the bottom door 37 is to be opened. See FIG. 1. However, if one needs to gain access to the rear of the camera body 13, a back door 39 pivotally coupled to the camera body can be opened.

The invention has been described with reference to a preferred embodiment. However, it will be appreciated that various modifications can be made within the ordinary skill in the art without departing from the scope of the invention. For example, instead of including the bottom door 37 and the back door 39, a single door may be used which when opened uncovers the first and second chamber portions 15 and 29, the flat surface 23, the slit 33, and the ledge 35. In this instance, a tab would extend across the second chamber portion 29 to hold the cartridge C laterally in that chamber portion when the single door is opened.

We claim:

1. A photographic camera intended to be used with a film cartridge that has a normally curled film leader protruding from the film cartridge, said camera comprising:

a first cartridge-receiving chamber portion having an open end and side which allow the film cartridge to be received in said first chamber portion laterally through said open side with one end of the film cartridge protruding from said open end and the curled film leader protruding from the open side, to permit the one end to be manually grasped in order to rotate the film cartridge within the first chamber portion in the particular direction of curl of the film leader;

an elongate surface arranged proximate said first chamber portion to force the curled film leader to uncurl against said elongate surface to substantially flatten when the film cartridge is rotated within the first chamber portion in the particular direction of curl of the film leader; and a second cartridge-receiving chamber portion having an open end which opens to said first chamber portion to allow the film cartridge to be inserted with the film leader substantially flattened against said elongate surface into said second chamber portion from the first chamber portion.

2. A photographic camera as recited in claim 1, further comprising:

stop means located immediately between said first chamber portion and said elongate surface for preventing rotation of the film cartridge within the first chamber portion in the direction of curl of the film leader when the film leader is substantially flattened against the elongate surface.

3. A photographic camera as recited in claim 1, further comprising:

body means normally covering said first and second chamber portions and said elongate surface;

said body means includes a door supported for opening movement to uncover said first chamber portion and said elongate surface but not said second chamber portion.

4. A photographic camera as recited in claim 1, wherein said elongate surface includes indicator means for visibly indicating the location of the film leader when it is substantially flattened against the elongate surface.

5. A photographic camera as recited in claim 1, further comprising:

body means normally covering said first and second chamber portions and said elongate surface;

said body means includes a first door supported for opening movement to uncover said first chamber portion and said elongate surface but not said second chamber portion, and a second door supported for opening movement to uncover the second chamber portion.

6. A photographic camera as recited in claim 1, further comprising:

blocking means for preventing insertion of the film cartridge into said second chamber portion from said first chamber portion unless the film leader is substantially flattened against said elongate surface.

7. A photographic camera as recited in claim 6, wherein a slit extends immediately between said elongate surface and said blocking means for receiving the film leader when the film cartridge is inserted with the film leader substantially flattened against the elongate surface into said second chamber portion from said first chamber portion.

* * * * *